United States Patent [19]
Naik

[11] Patent Number: 5,668,725
[45] Date of Patent: Sep. 16, 1997

[54] INTERNAL COMBUSTION ENGINE MISFIRE DETECTION

[75] Inventor: Sanjeev Manubhai Naik, Sterling Heights, Mich.

[73] Assignee: General Motors Corporation, Detroit, Mich.

[21] Appl. No.: 555,661

[22] Filed: Nov. 13, 1995

[51] Int. Cl.$^6$ .............................. G01M 15/00; G06F 15/00
[52] U.S. Cl. ........................... 701/111; 123/419; 73/116; 73/117.3; 701/101
[58] Field of Search ................ 364/431.08, 431.03, 364/431.04, 551.01; 73/116, 117.3; 123/419, 436

[56] References Cited

U.S. PATENT DOCUMENTS

| | | | |
|---|---|---|---|
| 5,237,504 | 8/1993 | Holmes et al. | 364/431.08 |
| 5,345,817 | 9/1994 | Green et al. | 73/117.3 |
| 5,509,302 | 4/1996 | Drexel et al. | 73/117.3 |
| 5,576,963 | 11/1996 | Ribbens et al. | 364/431.08 |

*Primary Examiner*—Kevin J. Teska
*Assistant Examiner*—Tan Q. Nguyen
*Attorney, Agent, or Firm*—Michael J. Bridges

[57] ABSTRACT

Internal combustion engine control and diagnostics provides for delivery of a fuel quantity and intake air to engine cylinders and for an ignition signal to ignite the air and fuel, wherein misfire conditions in the cylinder are diagnosed over all operating conditions through a reference period model of the components of measured reference periods not attributed to a misfire condition and through removal of such components from measured reference periods yielding a resultant reference period component sensitive only to misfire conditions. The magnitude, position, and stability of the resultant component indicates misfire severity, location, and persistence.

10 Claims, 3 Drawing Sheets

1

INTERNAL COMBUSTION ENGINE MISFIRE DETECTION

FIELD OF THE INVENTION

This invention relates to internal combustion engine diagnostics and, more particularly, to detection of misfire conditions in internal combustion engine cylinders.

BACKGROUND OF THE INVENTION

Internal combustion engine misfire conditions occur when an air-fuel mixture in an engine cylinder is improperly consumed. Misfire conditions may be caused by a missing or improperly timed delivery of fuel, insufficient delivery of cylinder intake air, or a missing or improperly timed cylinder spark event. Reduced engine performance and fuel economy or increased engine emissions may result from a misfire condition. Misfire conditions must be accurately diagnosed to avoid unnecessary application of misfire treatment procedures.

Misfire detection procedures have been proposed for measuring sub-cyclic engine speed as communicated by passage of teeth or notches about an engine output shaft and by detecting misfire conditions following detection of a pattern of short speed decreases. Such procedures typically only operate when certain entry conditions are present. Misfires occurring when the entry conditions are not present are not detected. Such procedures may require addition of costly hardware on the vehicle, adding to vehicle cost and adding sources of potential fault conditions. Such procedures further may be computationally intensive, adding significantly to engine or vehicle controller throughput burden. Such procedures may still further not compensate for the corrupting effect of time varying disturbances and noise on engine parameter signals, which can reduce diagnostic integrity. Those procedures that do attempt to compensate for disturbances only learn and correct for tooth machining errors. The learning requires specific engine operating conditions. If the conditions are not present, the learning and correction does not take place and the diagnostic cannot function accurately.

The signal to noise ratio of conventional misfire detection proposals using sub-cyclic engine speed information is typically low in certain engine operating ranges, such as in low engine load, medium to high engine speed ranges. This is because the change in engine speed following a misfire condition is commonly small in these ranges and the level of noise and disturbances corrupting the engine speed signal is typically large. Several factors tend to increase the magnitude of the noise and disturbances. These factors include runout, cylinder to cylinder variation, torsionals, driveline noise, output shaft tooth or notch machining error, rough driving surface disturbances, and measurement resolution limitations. Current misfire diagnostic proposals are therefore prone to misdiagnosis, and especially in certain, frequently occurring engine operating ranges. Misdiagnosis can lead to application of unnecessary, costly and time-consuming fault treatment procedures.

It would therefore be desirable to provide for accurate misfire detection over all engine operating conditions that minimizes diagnostic sensitivity to noise, transients and disturbances, without adding significant cost and without overburdening the system.

SUMMARY OF THE INVENTION

The present invention is a desirable misfire detection approach that continually compensates for noise, transients, and disturbances to minimize sensitivity thereto, that is not restricted to operation with limiting engine operating conditions, that adds no additional hardware to the system, and that minimizes controller throughput burden.

More specifically, the present approach provides an engine reference period model including a model of base reference period information, noise, transients and disturbances, and a remaining value. The base reference period, transients, disturbances, and noise are efficiently isolated and removed from the model. The remaining model content is sensitive to engine cylinder misfire conditions, and may then be directly analyzed to determine the severity and persistence of any misfire condition, and to determine the source of any such condition.

In a further aspect of this invention, a two stage diagnostic is provided. In a first stage, signal transients of a relatively slow, time-varying pattern are determined and removed from reference period measurements, with an ideal reference period signal content corresponding to normal (no misfire) conditions also removed. The processed reference period measurements are then applied in a second stage to remove disturbances and noise, including time-varying disturbances and noise, through application of a dynamic model which estimates noise and disturbances present in each reference period measurement. The magnitude of the remaining signal content represents the contribution to the reference period measurements made by any misfire condition that occurred over a predetermined sampling period. In yet a further aspect of this invention, the severity and persistence of the condition and still further the responsible cylinder may be identified using such remaining signal content. Misfire counters may be provided for each of the engine cylinders to log occurrences of any misfire conditions, so that treatment may be applied in response to severity or frequency of misfire occurrences.

In yet a further aspect of this invention, the model is implemented through simple matrix algebra, to simplify the analysis and to minimize system throughput burden. Simple arrays of reference period information are maintained and applied with a minimum of computation to model and remove the impact of time-varying disturbances, noise and transients.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
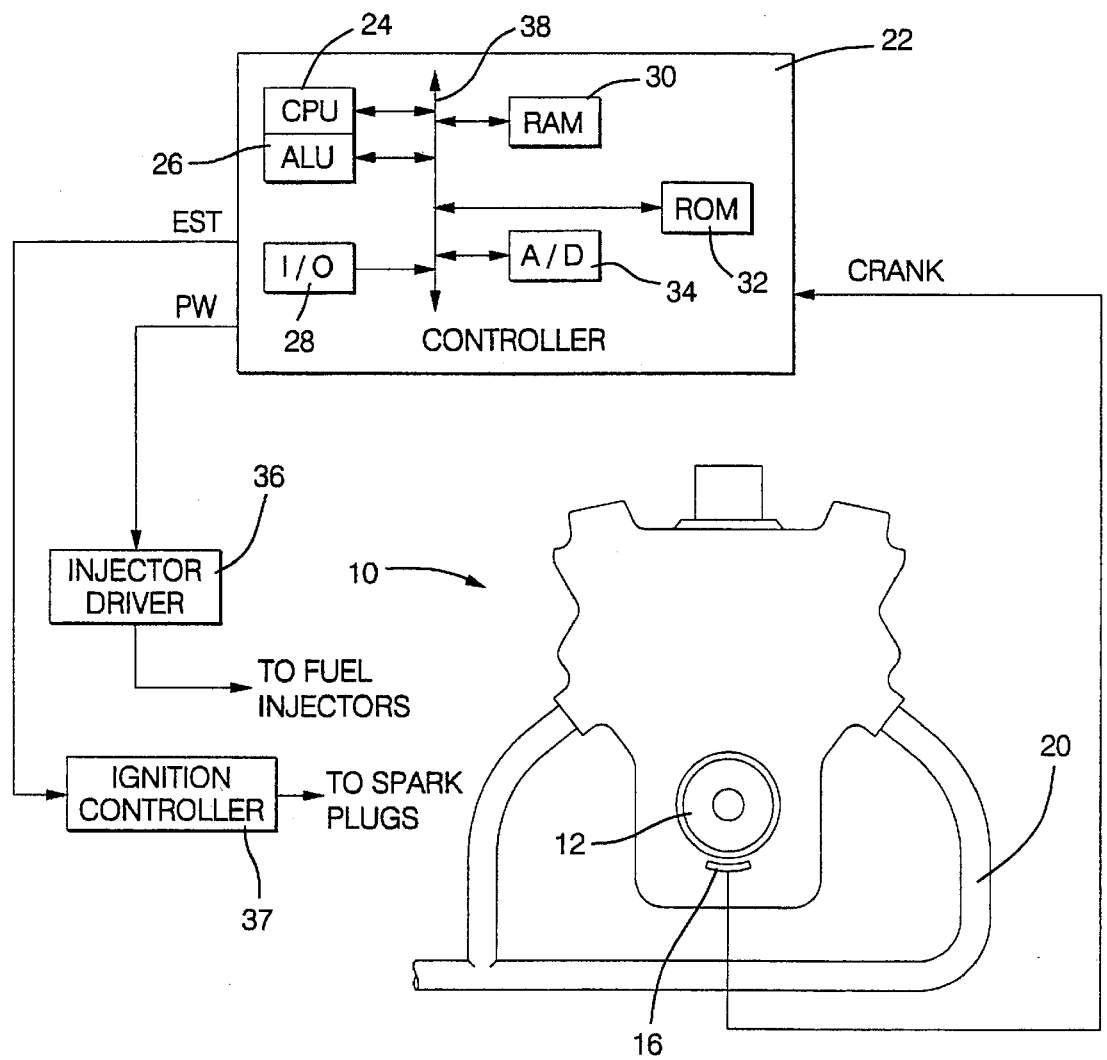
FIG. 1 is a general diagram of the engine and engine control hardware for carrying out the preferred embodiment of the invention.
Figure 2:
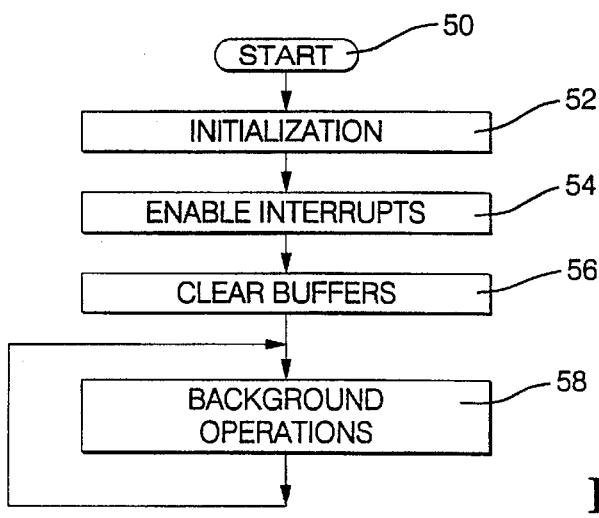
FIGS. 2–4 are flowchart diagrams illustrating a flow of controller operations for carrying out the invention in accord with the engine and engine control hardware of FIG. 1.
Figure 3:
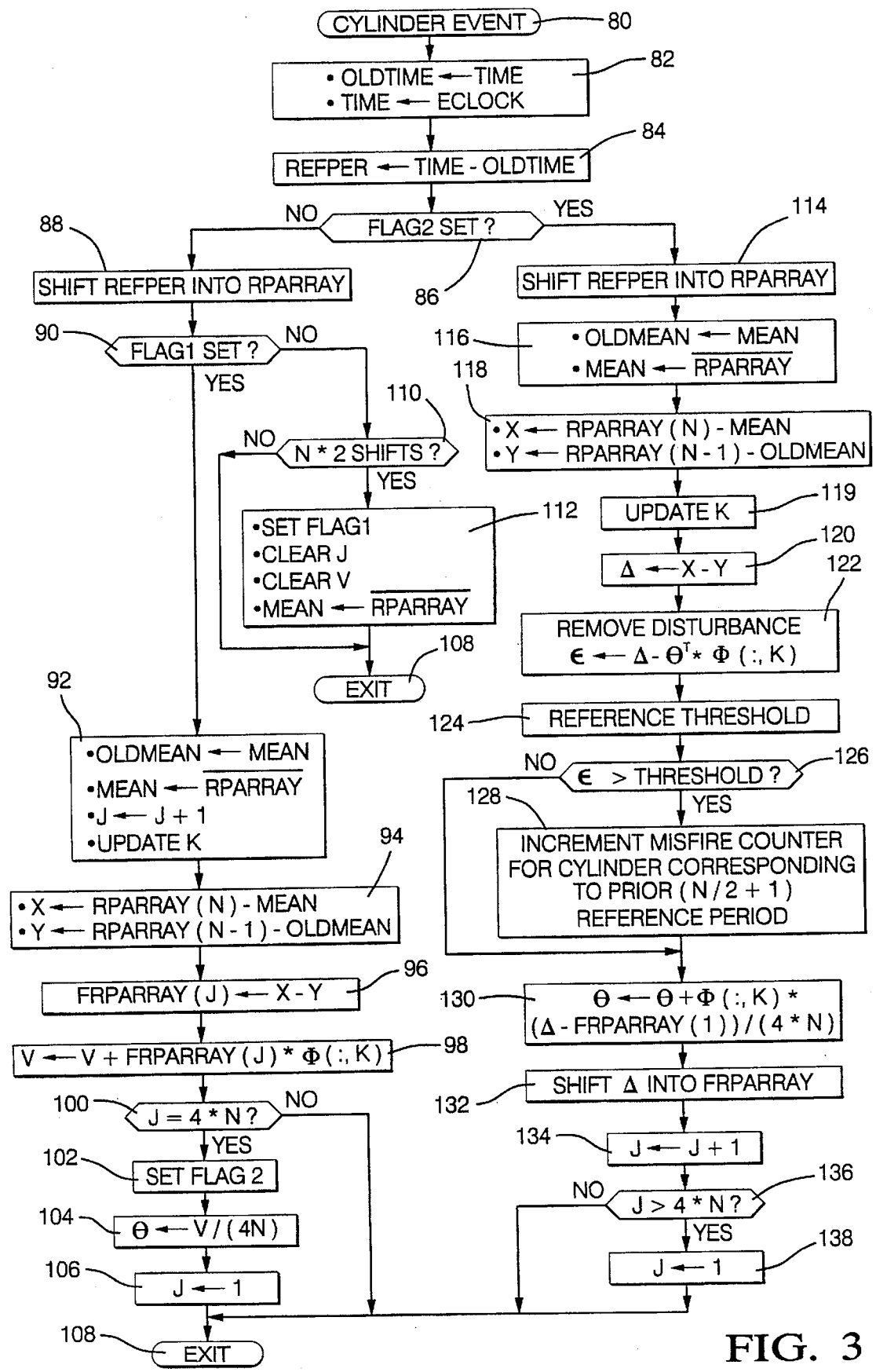
Figure 4:
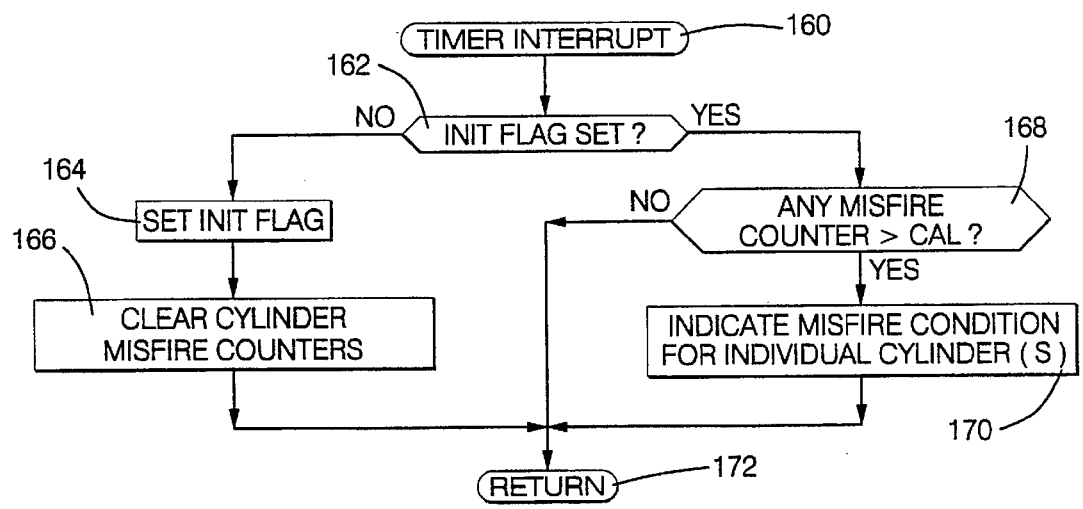

A brief description of the principles of this invention is provided prior to detailed description of the FIGURES, to provide clarification of the principles embodied in the controller operations of FIGS. 2–4 carried out by the engine and engine control hardware of FIG. 1. The preferred embodiment of this invention relies on the following developed mathematical model of engine reference periods which are defined as the period of time between consecutive engine cylinder events. The nth measured reference period T(n) may be expressed under the model as $$T(n) = \sum_{k=1}^{N/2} [a_k \cos(2\pi k n/N) + b_k \sin(2\pi k n/N)] + c_0 + c_1 n + M(n) + e(n)$$

in which N is the number of cylinders in the engine application. T(n) may also be expressed as T(n)=d(n)+c(n)+M(n)+e(n), in which d(n) represents the combined effects of noise and disturbances having a period of N cylinder events, or one engine cycle, and c(n)+M(n) represents the ideal reference period of the engine under normal (no misfire) conditions. e(n) therefore represents the content of the measured reference period that normally is about zero, but becomes large under misfire conditions. This is the element of the measured reference period that is isolated and analyzed in accord with this invention. Specifically, estimates of the difference e(n)–e(n–1) for consecutive engine cylinder events n and n–1 are determined and analyzed.

First, the element M(n) is computed using a running mean computation and is removed from the measured reference periods. Removing M(n) removes many long term acceleration effects on the reference period information which result from engine intake air (throttle) valve position variations and engine load variations. Such portion of the ideal reference period is thus removed from the measured reference periods. Next, to isolate e(n), the elements d(n) and c(n) are computed and removed. Removing d(n) removes system disturbance and noise components that can corrupt reference period measurements. Removing c(n) removes steady state or d.c. components corresponding to the ideal reference period from the reference period measurement. To remove d(n) and c(n), a periodic, time-varying reference period model is developed and expressed in terms of periodic basis functions. More specifically, the measured nth reference period value T(n) is expressed as $$T(n) = \bar{\theta}^T * \bar{\phi}(n) + M(n) + e(n)$$

in which $$\bar{\theta} = [a_1\ b_1\ a_2\ b_2\ \ldots\ a_{N/2}\ c_0 c_1]$$

and $$\bar{\phi}(n) = [2^{1/2}*\cos(2\pi n/N),\ 2^{1/2}*\sin(2\pi n/N),\ 2^{1/2}*\cos 4\pi n/N,\ 2^{1/2}*\sin(4\pi n/N),\ \ldots,\ \cos(\pi n),\ 1,\ n].$$

y(n) is defined as $$y(n) = (T(n) - M(n)) - (T(n-1) - M(n-1))$$

and further $$y(n) = \theta^T * \phi(n) + e(n) - e(n-1)$$

in which $$\theta = [\theta_1 \theta_2 \theta_3 \theta_4 \ldots \theta_N]$$

and $$\phi(n) = \begin{bmatrix} 2^{1/2}\cos(2\pi n/N) & 2^{1/2}\sin(2\pi n/N) \\ 2^{1/2}\cos(4\pi n/N) & 2^{1/2}\sin(4\pi n/N) \\ \ldots & \\ \cos(\pi n) & 1 \end{bmatrix}$$

An estimate of $\theta$, denoted $\hat{\theta}$, using a least squares technique based on L different reference period measurements, is provided as $$\hat{\theta} = P(L) * b(L)$$

in which $$P(L) = \left[\sum_{n=1}^{L} \phi(n)\phi(n)^T\right]^{-1} = 1/L$$

and $$b(L) = \left[\sum_{n=1}^{L} y(n)\phi(n)\right].$$

The estimate of $\theta$ is then applied to determine an estimate of e(n)–e(n–1), called $\epsilon(n)$, as follows $$\epsilon(n) = y(n) - \hat{\theta}(L)^T \phi(n).$$

A misfire condition is detected when $\epsilon(n)$ exceeds a calibrated threshold.

The determination of the estimate $\epsilon(n)$ for the present embodiment of this invention is as provided through the operations of FIGS. 2–4, to be described. The misfire diagnostic of this embodiment is applied to the engine 10 and engine control hardware of FIG. 1. Specifically, referring to FIG. 1, an internal combustion engine 10 having output shaft 12, such as a crankshaft, communicates passage of a plurality of teeth or notches (not shown) disposed about the circumference of the output shaft 12 by a conventional wheel speed sensor 16, such as a variable reluctance or Hall effect sensor. The sensor 16 is fixedly positioned relative to the output shaft 12 to have a magnetic field generated by the sensor disrupted in a predictable manner by the passage of the teeth. The sensor transduces such disruption into a substantially sinusoidal output voltage signal CRANK having a period corresponding to the rate of passage of the teeth by the sensor wherein each cycle of the signal corresponds to a passage of a tooth or notch of the output shaft 12 past the sensor. The engine angular position within an engine cycle may thereby be sensed wherein predetermined engine cylinder events correspond to cycles of the periodic signal CRANK. In the N cylinder engine of this embodiment, for example wherein N is eight, at least N/2 teeth or notches are disposed on the output shaft 12 in position to pass the sensor 16, such that with an eight cylinder, four cycle engine of the present embodiment, at least eight teeth pass the sensor 16 for each engine cycle, each one corresponding to an event of a corresponding one engine cylinder. The sensor 16 output signal CRANK is communicated to an engine controller 22. Engine 10 receives intake air through an intake air bore 14 for distribution to and combustion in engine cylinders. The controller 22 generates a fuel injection command in the form of a injector pulse width PW command for driving engine fuel injectors (not shown) so that a precise fuel quantity is delivered to the engine to be mixed with the intake air so as to provide a beneficial engine air/fuel ratio. Any conventional engine fueling control approach may be employed to provide the fuel injection command generation in this embodiment. The command PW is output by the controller 22 to a fuel injector driver 36, such as a commercially-available fuel injector drive and distribution circuit for applying the command PW to a next active fuel injector in the form of a pulse width. The injector is opened for the duration of such pulse width for metering pressurized fuel to an intake air passage of a corresponding engine cylinder (not shown).

The injected fuel is mixed with the intake air and admitted to engine cylinders for combustion therein. Cylinder combustion is provided in accord with a periodic ignition timing signal provided by controller 22 to ignition controller 37. Signal EST represents the engine angular position at which the admitted air-fuel mixture is to be ignited in the next engine cylinder to undergo a combustion event. Ignition controller 37 may be a conventional spark plug drive circuit for issuing a drive signal to individual spark plugs (not shown) at the time such plugs are carrying out the described ignition event in a respective engine cylinder. The exhaust gas produced in such cylinder combustion process is exhausted out of the engine through exhaust gas conduit 20. The improper combustion of the air-fuel mixture, such as caused by improper fuel injection or ignition control timing, significant air/fuel ratio error, or a missing fueling or ignition event, resulting in significantly reduced engine performance, increased engine emissions, or reduced engine fuel economy, is diagnosed in accord with this invention as a misfire condition.

The controller 22 may be a standard microcomputer, such as a Motorola series microcomputer, having such conventional elements as a read only memory ROM 32 for storing permanent data constants, such as individual constants and constants stored in the form of conventional lookup tables, and control, diagnostic, and maintenance instructions in the form of software routines. The controller further includes random access memory RAM 30, for short term or fast access data value storage, analog to digital conversion devices A/D 34 for translating analog input signals into digital equivalents, input/output circuitry I/O 28 for transmitting and receiving signal information between the controller 22 and external devices, such as sensors, actuators, and other controllers for carrying out vehicle control functions or on-board or off-board diagnostic procedures. The controller 22 further includes a central processing unit CPU 24 having arithmetic logic circuitry ALU 26 and general control circuitry for carrying out mathematical operations on data and for providing control signals to manage controller functions in a manner generally understood in the art. Address and data information is passed between the elements of the controller 22 via a conventional bus network 38 including standard data and address busses. The CPU 24 executes a series of operations in the form of software routines to read, condition, and store inputs from vehicle sensors and to generate and issue a number of control signals to engine control and diagnostic actuators, controllers, diagnostic tools, and indicators.

The series of operations for carrying out the control and diagnostics of the preferred embodiment of this invention are detailed in the FIGS. 2-4. The operations of FIGS. 2-4 are not intended to provide for all details needed to conventionally control, diagnose and maintain the automotive vehicle in which they operate. Such additional details may be provided through any standard vehicle control, diagnostic, and maintenance operations as are generally understood by those possessing ordinary skill in the art. The operations of FIGS. 2-4 are intended to supplement such generally known operations to provide for a carrying out of the preferred embodiment of this invention.

Specifically, the operations of the routine of FIG. 2 are initiated at a step 50 upon application of a startup command to an otherwise inactive controller 22, such as when a vehicle operator manually rotates an ignition key to an "on" position at the initiation of a vehicle operating cycle. The routine moves from the step 50 to provide for controller initialization at a next step 52 by carrying out such standard initialization operations as transferring data constants from ROM 32 locations to RAM 30 locations, setting pointers, counters, and flags to predetermined initial values, clearing memory locations, and setting certain memory locations to pre-established initial values. A series of timer and event based interrupts are next enabled at a step 54 to occur following occurrence of certain pre-established time intervals, or following certain engine events. In this embodiment, in addition to any interrupts that may be enabled to provide for conventional engine control, diagnostic, or maintenance operations, a timer interrupt is enabled to occur about every 3.125 milliseconds while the controller 22 is operating, and an output shaft event interrupt is enabled to occur upon each cylinder event corresponding to passage of the N/2 teeth or notches of the output shaft 12 (FIG. 1) by the sensor 16. Service routines in the form of a series of service operations are provided to service each of these interrupts. For instance, the controller 22 (FIG. 1) will, upon occurrence of the interrupt, temporarily suspend any current operations (assuming such current operations are of a lower prescribed priority in the controller priority hierarchy than the current interrupt), and will execute a corresponding interrupt service routine including a series of controller operations. The service routine for the 3.125 millisecond timer interrupt includes the operations of FIG. 4, and the service routine for the engine cylinder event interrupt includes the operations of FIG. 3.

After enabling the interrupts, a first buffer RPARRAY, having $2*N$ entries in this embodiment, for storing a most recent $2*N$ reference periods, and a second buffer FRPARRAY, having $4*N$ entries for storing a most recent $4*N$ filtered reference periods, are cleared at a next step 56, in preparation for the routine of FIG. 3, to be described. The routine of FIG. 2 next proceeds to continuously carry out a set of standard background operations at a step 58, including conventional diagnostic and maintenance operations generally known in the art. Such operations will be suspended upon occurrence of a controller interrupt, such as a 3.125 millisecond timer interrupt or a cylinder event interrupt.

The series of operations forming the routine of FIG. 3 is executed upon occurrence of an engine cylinder event, such as occurring once for each cylinder during each engine cycle. The service routine is initiated following the interrupt at a step 80 and proceeds to next store a value stored previously in RAM location labeled as TIME into a new RAM location labeled as OLDTIME at a step 82. The time of the current cylinder event interrupt, substantially as indicated by the current value of a controller free running clock ECLOCK is stored then in the RAM location labeled as TIME. A reference period REFPER, defined as the time required for a consecutive pair of teeth or notches on the engine output shaft to pass the sensor 16 of FIG. 1 is calculated as the difference between TIME and OLDTIME at a next step 84. The status of a flag FLAG2, stored in RAM 30 (FIG. 1) is next determined at a step 86. If FLAG2 is set, both buffers RPARRAY having $2*N$ entries and FRPARRAY having $4*N$ entries have been filled at least once during the current vehicle operating cycle, and the diagnostic may be expeditiously carried out by executing the step 114–138, to be described. Otherwise, the buffers have not yet been filled and the step 88–106 must be executed to fill the buffers to initialize the diagnostic of this embodiment. Specifically, if FLAG2 is not determined to be set at the step 86, a step 88 provides for the current REFPER value to be shifted into RPARRAY as the newest entry thereto with index (2*N), while shifting out the oldest entry in the 2*N entry array having index (1) to maintain the buffer at a constant 2*N size. The status of a RAM flag FLAG1 is next determined at a step 90. If FLAG1 is set, the buffer RPARRAY has been filled with at least 2*N REFPER values through repeated execution of the operations of FIG. 3, and the buffer FRPARRAY may then be filled through execution of the steps 92–106, to be described. IF RPARRAY is not yet filled as indicated by FLAG1 being clear at the step 90, a number of shifts into the buffer is next determined at the step 110. If N*2 shifts have been made, the buffer is now filled and FLAG1 is set at a next step 112. The value MEAN is also updated at the step 112 as follows $$\text{MEAN}=(\text{RPARRAY}(1)+\text{RPARRAY}(2)+\ldots+\text{RPARRAY}(2*N))/(2*N).$$

Pointer J and vector V, to be described, are also cleared at the step 112, after which a step 108 is executed to return from the service routine of FIG. 3 to carry out further cylinder event interrupt service operations, including operations for generating, through conventional fuel control procedures, a fueling command in the form of an injector pulse width PW, and for outputting PW to fuel injector driver 36 (FIG. 1) for controlling engine fuel injectors. Such operations also include operations for generating, through conventional ignition timing control procedures, a spark timing command EST representing an engine angular position for igniting an air-fuel mixture admitted to engine cylinders, for controlling engine operation. Such additional operations are generally known to those possessing ordinary skill in the art to which this invention pertains. After completing such conventional operations, the routine of FIG. 3 returns to resume a carrying out of the operations that were suspended to provide for the servicing of the current crank event interrupt.

Returning to the step 90, if FLAG1 is set, the buffer values are used to begin filling the second buffer FRPARRAY, by first, at a step 92, storing the value MEAN as OLDMEAN, and updating MEAN. The pointer J is also incremented at the step 92 and a pointer K is updated as follows:

$$K=\text{REM}(J,N)$$

which is provided as notation indicating that K is computed as the remainder of J with respect to N with a reset function providing that if K is zero at the step 92 it is reset to N. Accordingly, as J cycles from 1 to 4*N, K cycles from 1 to N four times as provided by the update function of step 92. The calculated value MEAN corresponds to a simple average or other representative value of the 2*N entries in RPARRAY centered around the Nth entry in the array, wherein N is set to the number of cylinders of the engine 10 (FIG. 1), which is eight in this embodiment.

Temporary storage value X is next calculated at a step 94 to represent the deviation of the Nth entry in RPARRAY away from MEAN, to remove transient content of a relatively slow nature from the Nth reference period signal. A temporary storage value Y is also calculated at the step 94 by subtracting the most recent prior mean value OLDMEAN which is the mean value of RPARRAY centered at the (N–1)th entry in RPARRAY. X and Y therefore provide for reference period information with the slow transients removed. The transient removal is the first stage of processing of the reference period information in accord with this invention to provide for accurate misfire detection.

The Jth entry in FRPARRAY is next calculated at a step 96 as the difference X–Y, and stored as FRPARRAY(J) in RAM 30 (FIG. 1). The buffer FRPARRAY contains the differences between consecutive reference period measurements with corresponding mean values removed. The entries in FRPARRAY are to be used in a determination and removal of noise and disturbances from measured reference periods. The vector v is next updated at a step 98, as follows $$v=v+\text{FRPARRAY}(J)*\Phi(:,K),$$

in which $\Phi(:,K)$ denotes the Kth column of the following matrix $\Phi$ for an eight cylinder engine:

$$\Phi = \begin{matrix} 1 & 1 & 1 & 1 & 1 & 1 & 1 & 1 \\ 1/2^{1/2} & 0 & -1/2^{1/2} & -1 & -1/2^{1/2} & 0 & 1/2^{1/2} & 1 \\ 1/2^{1/2} & 1 & 1/2^{1/2} & 0 & -1/2^{1/2} & -1 & -1/2^{1/2} & 1 \\ 0 & -1 & 0 & 1 & 0 & -1 & 0 & 1 \\ 1 & 0 & -1 & 0 & 1 & 0 & -1 & 0 \\ -1/2^{1/2} & 0 & 1/2^{1/2} & -1 & 1/2^{1/2} & 0 & -1/2^{1/2} & 1 \\ 1/2^{1/2} & -1 & 1/2^{1/2} & 0 & -1/2^{1/2} & 1 & -1/2^{1/2} & 0 \\ -1 & 1 & -1 & 1 & -1 & 1 & -1 & 1 \end{matrix}$$

The vector v represents a correlation between the FRPARRAY( ) entries and the matrix $\Phi[\ ]$, and is used to calculate the described model component $\theta$, as will be further detailed. The magnitude of pointer J is next compared to 4*N, which is the size of the FRPARRAY( ) vector, at a step 100. If J equals 4*N, the second buffer FRPARRAY( ) is full, and FLAG2 is set at a next step 102. The vector $\theta$ is then calculated at a next step 104 as v/(4*N), for determining the value $\epsilon$ as described, and the pointer J is then reset to one at a next step 106. Next, or if FRPARRAY is determined to not yet be full at the step 100, the described step 108 is executed.

Returning to the step 86, if FLAG2 is set, indicating the buffer FRPARRAY has received at least 4*N entries through prior iterations of the routine of FIG. 3, then the current reference period value REFPER is shifted into RPARRAY at a next step 114 and the oldest entry of RPARRAY, called RPARRAY(1) is shifted out of the array. Next, RPARRAY mean values are updated at the step 116, by storing the most recent prior calculated mean value MEAN into RAM location OLDMEAN, and storing the mean magnitude of the current 2*N entries of RPARRAY, calculated for example as a simple average of the 2*N RPARRAY entries, as described at the step 92, as the current MEAN value in RAM 30 (FIG. 1). The temporary values X and Y are next calculated at the step 118, for removing transients from the reference period information through the calculations described at the prior step 94. The pointer K is next updated at a step 119, such as in the manner detailed at the prior step 92. The values X and Y are used to determine a difference value $\Delta$ equal to X–Y at a next step 120, to be stored as the next FRPARRAY( ) entry. To remove disturbances from the value $\Delta$, so as to arrive at a value $\epsilon$ representing the component of engine speed information corresponding to the contribution of misfire conditions to the reference period signal content, as described, the modeled disturbance magnitude is removed from the value $\Delta$ at a next step 122 as follows $$\epsilon = \Delta - \theta^T * \Phi(:,K)$$

in accord with the described reference period model.

Figure 5:
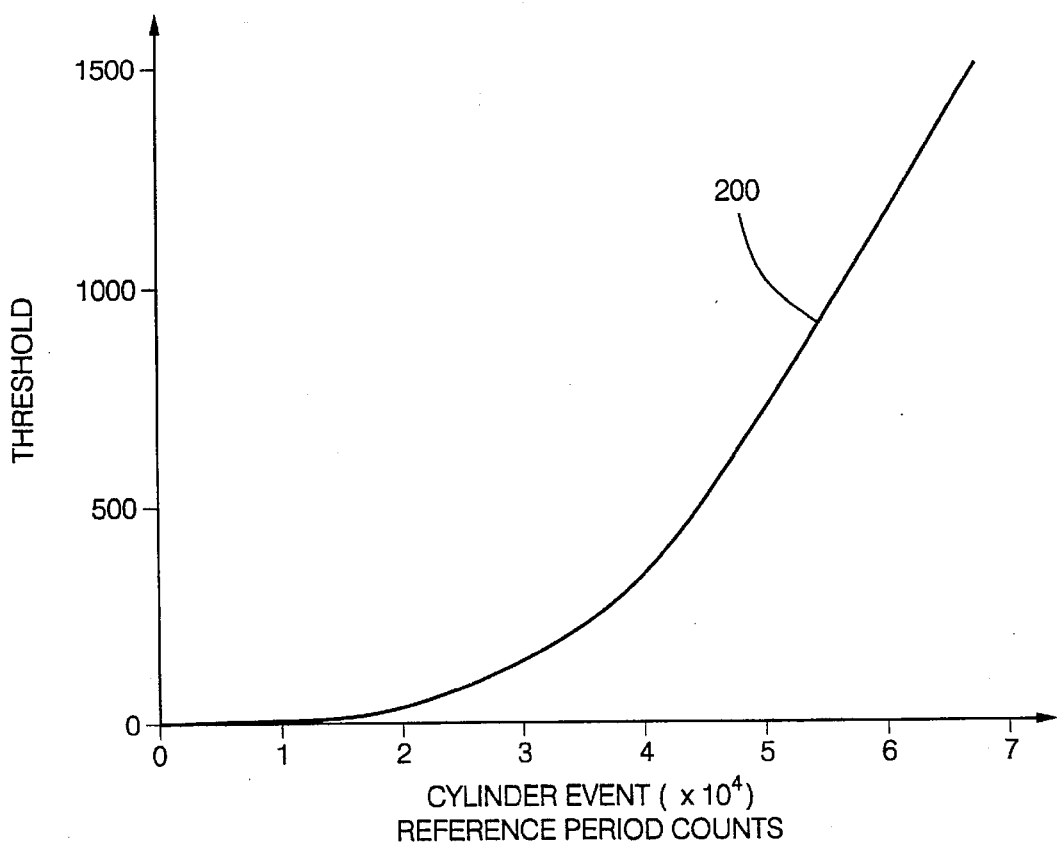
FIG. 5 is a graphical diagram illustrating a referenced engine speed threshold expressed as a function of cylinder event reference period counts at a representative engine load condition.

A misfire threshold magnitude is next referenced at a step 124, for example by referencing a stored threshold from a schedule of thresholds calibrated and stored as a function of engine operating level, such as indicated by current engine speed and load. FIG. 5 illustrates a typical calibration curve 200 for a given engine load and for a range of engine speeds indicated by the number of reference period counts measured between consecutive engine combustion events. Such curve is generated through a conventional calibration process as the threshold magnitude needed to distinguish a misfire condition from a non-misfire condition at each engine operating level. For example, calibration points may be defined by a series of engine load points along the engine load range and by a series of engine speed points along the engine speed range. The engine load and cylinder event rate are set to each of the points and engine cylinder misfire conditions induced. The values $\epsilon$ are then determined. A threshold value for each point is then set so that for induced misfire conditions, the value $\epsilon$ will have a magnitude above the threshold and for non-misfire conditions, the value $\epsilon$ will be below the threshold. An example of such a calibration process for one engine load condition over a range of cylinder event rates is provided by curve 200 of FIG. 5. The calibrated thresholds may be stored in the form of a conventional lookup table in ROM 32 (FIG. 1).

Returning to FIG. 3, after referencing the threshold value at the step 124, the value $\epsilon$ is compared to the threshold at a step 126. If $\epsilon$ exceeds the threshold, a misfire condition is detected in an engine cylinder and a corresponding misfire counter for that cylinder is incremented at a next step 128. The misfire counter that is incremented is a counter corresponding to the reference period N/2+1 reference period prior to the current reference period. Each cylinder has a counter which may be stored as a singlescalar value in a RAM 30 (FIG. 1) location to log the number of sensed misfire conditions for each cylinder over a vehicle drive cycle. Alternatively, the cylinder counters may be stored in non-volatile portion of RAM so as to be preserved from one vehicle drive cycle to the next, so that the number of cylinder misfire conditions over a plurality of vehicle drive cycles may be logged. In an alternative embodiment, the magnitude of $\epsilon$ may be used as an indication of misfire severity, such as by generating a misfire severity value as a predetermined function of the magnitude of $\epsilon$, such as a linear function proportional to the magnitude of $\epsilon$.

Next, or if s is not determined to exceed the threshold at the step 126, the vector $\theta$ is updated at a next step 130 as follows:

$$\theta = \theta + \Phi(:,K) * (\Delta - FRPARRAY(1))/(4*N)$$

which is a simplified formula for adding the most recent FRPARRAY( ) entry, called $\Delta$, to the $\theta$ value and removing the oldest FRPARRAY value, called FRPARRAY(1), therefrom, so that the most recent disturbance information is included in $\theta$, in accord with the described model.

The buffer FRPARRAY( ) is next updated at a step 132 by shifting the most recent value A into the buffer as FRPARRAY(4*N) and shifting out FRPARRAY(1), the oldest buffer entry. The pointer J is next incremented to point to the next buffer entry at a step 134. If J exceeds 4*N, the size of the FRPARRAY buffer, as determined at a next step 136, then it is reset to one at a next step 138. Next, or if J is determined to not exceed 4*N at the step 136, the described step 108 is executed.

Referring to FIG. 4, a series of operations, executed periodically while the controller 22 of FIG. 1 is operating, such as about every 100 milliseconds while the controller is operating, are illustrated. Such operations are invoked following a timer interrupt set up to repeatedly occur when a period of time elapses, such as about 100 milliseconds, as described. Following the interrupt, or a plurality of such interrupts spanning about the 100 milliseconds, the routine of FIG. 4 is initiated starting at a step 160 and proceeding to a step 162 to determine if the INIT flag, stored in RAM 30 is set. If the flag is not set, the misfire counters must be initialized to zero for each cylinder at a next step 166 to provide for a new misfire test in accord with this embodiment. Alternatively, the counters may be cleared once at the beginning of each vehicle operating cycle at the described step 52 of FIG. 2. Still further, the counters may be cleared at the start of a first vehicle operating cycle only so that cylinder misfire conditions may be logged for multiple vehicle operating cycles, as described. After clearing the counters, the routine returns from the service operations of FIG. 4 to any prior operations, including further operations to service the timer interrupt or to any operations that were temporarily suspended upon occurrence of the timer interrupt to allow the interrupt service operations to be carried out.

Returning to the step 162, if the INIT flag is set, the counters have already been initialized, and the counters are compared to a misfire counter threshold CAL at a next step 168. The value CAL may be established during a conventional calibration process as a single constant or as a constant referenced from a stored schedule of constants. The stored schedule may be stored as a function of an engine operating condition, for example as indicated by current engine speed or current engine cylinder load. The threshold CAL is provided to avoid indicating a misfire condition until and unless a pattern of engine cylinder activity corresponding to an undesirable misfire condition is established, to avoid unnecessary or wasteful misfire treatment procedures. If any cylinder misfire counter exceeds the threshold CAL at the step 168, a misfire condition for that cylinder or those cylinders is indicated at a next step 170, for example by illuminating a lamp or energizing a conventional aural alert to notify the vehicle operator of the condition. A misfire condition code may also be stored in controller RAM 30 (FIG. 1) to indicate the nature of the misfire condition, such as the responsible cylinder, the degree of severity as indicated by the size of the individual $\epsilon$ values, the persistence of the condition indicated by the number of logged misfire conditions for the cylinder or for the engine over a predetermined time period or over a predetermined number of engine cycles, etc., so that treatment of the condition may be applied efficiently. After indicating the misfire condition, the described step 172 is executed.

The preferred embodiment for the purpose of explaining this invention is not to be taken as limiting or restricting this invention since many modifications may be made through the exercise of ordinary skill in the art without departing from the scope of the invention.

The embodiments of the invention in which a property of privilege is claimed are described as follows:

1. In an internal combustion engine having a plurality of cylinders each cylinder having a piston mechanically linked to a crankshaft and reciprocally driven in the cylinder to rotate the crankshaft by cylinder combustion events in which an air-fuel mixture provided to the engine cylinders is ignited by timed application of an ignition drive signal to cylinder spark plugs, a method for diagnosing improper combustion conditions in the engine cylinders, comprising the steps of:

generating fuel injection control commands;

outputting the fuel injection control commands to control delivery of fuel to the engine;

generating ignition control commands;

outputting the ignition control commands to drive spark plugs of the engine cylinders;

generating reference signals at predetermined angular positions of the crankshaft;

determining reference periods as timed durations between each adjacent reference signal; diagnosing an improper combustion condition in a selected engine cylinder, by (a) identifying a first and second determined reference period corresponding to the selected engine cylinder, (b) calculating an ideal reference period for the identified first and second determined reference periods, (c) estimating noise and disturbance content in the identified first and second reference periods, (d) processing the identified first and second reference periods by removing the ideal reference period and the estimated noise and disturbance content from said first and second reference periods, (e) forming a misfire component as a difference between the processed first and second reference periods, (f) comparing the magnitude of the misfire component to a predetermined threshold component, and (g) diagnosing an improper cylinder combustion condition in the selected engine cylinder when the magnitude of the misfire component exceeds the predetermined threshold component.

2. The method of claim 1, wherein the step of estimating noise and disturbance content further comprises the steps of:

modeling noise and disturbance signal content in a periodic, time-varying structure;

retrieving model reference periods corresponding to the identified first and second reference periods from the periodic, time-varying structure;

and wherein the processing step removes the estimated noise and disturbance content from said first and second reference periods by reducing said first and second reference periods by the corresponding retrieved model reference periods.

3. The method of claim 2, wherein the modeling step models the periodic, time-varying structure of noise and disturbance signal content in the generated signals by expressing the structure as periodic basis functions.

4. The method of claim 1, wherein the step of determining reference periods determines the reference periods over at least one complete engine cycle including at least one combustion event for each of the plurality of engine cylinders, and wherein the calculating step comprises the steps of:

calculating a representative period as a predetermined function of determined reference periods over the at least one complete engine cycle;

estimating a steady state reference period component as a component of the identified first and second reference periods having a substantially non-varying magnitude; and calculating the ideal reference period as a sum of the representative period and the steady state reference period.

5. The method of claim 4, wherein the step of calculating a representative period calculates the representative period as a mean of the determined reference periods over the at least one complete engine cycle.

6. The method of claim 1, further comprising the step of repeating the diagnosing step for each of the plurality of engine cylinders.

7. The method of claim 1, further comprising the steps of:

maintaining a count of diagnosed cylinder improper combustion conditions over a predetermined test period;

comparing the count to a predetermined count threshold at an end of the predetermined test period; and indicating a failure condition in the identified cylinder if the count exceeds the predetermined count threshold.

8. The method of claim 1, further comprising the steps of:

maintaining a count of diagnosed cylinder improper combustion conditions over a predetermined test period; and determining a misfire severity value as a predetermined function of the maintained count.

9. In an engine control system for issuing fuel injector control commands for controlling delivery of fuel to an engine having n cylinders and an output shaft, and for issuing ignition control commands to spark plugs for timing ignition, in a cylinder combustion event, of a mixture of engine intake air and the delivered fuel in engine cylinders, a method for diagnosing engine cylinder misfire conditions, comprising the steps of:

generating reference periods indicating output shaft rotation rate following each cylinder combustion event;

processing each individual reference period of a predetermined first and second reference period generated following combustion events in corresponding first and second engine cylinders, by:

(a) determining a reference period mean over a predetermined plurality of the generated reference periods including the individual reference period;

(b) removing transient content from the reference period by subtracting the mean from the individual reference period;

(c) removing periodic, time-varying noise and disturbance content from the individual reference period;

determining a difference between the processed first and second reference periods;

comparing the difference to a predetermined difference threshold value; and diagnosing a misfire condition in the first engine cylinder when the difference exceeds the predetermined difference threshold value.

10. The method of claim 8, wherein the step of removing periodic, time-varying noise and disturbance content further comprises the steps of:

modeling the periodic, time-varying structure of the noise and disturbance content as a periodic basis functions;

determining a model reference period corresponding to the individual reference period;

subtracting the model reference period from the individual reference period.

* * * * *